United States Patent [19]
Hearing

[11] Patent Number: 5,787,017
[45] Date of Patent: Jul. 28, 1998

[54] METHOD AND APPARATUS FOR ACQUIRING DATA FROM A MEASUREMENT TRANSDUCER

[75] Inventor: Stephen G. Hearing, Gaines, Mich.

[73] Assignee: LMI Corporation, Byron, Mich.

[21] Appl. No.: 844,232

[22] Filed: Apr. 18, 1997

[51] Int. Cl.[6] .................................................. G01B 21/00
[52] U.S. Cl. ........................ 364/564.444; 364/556.444; 364/561.041; 364/562.444
[58] Field of Search ..................... 364/550, 551.01, 364/551.02, 552, 560–564, 468.01, 468.16, 468.17, 468.18

[56] References Cited

U.S. PATENT DOCUMENTS

| | | |
|---|---|---|
| 4,294,682 | 10/1981 | Deczky . |
| 4,554,742 | 11/1985 | Freitag . |
| 4,606,129 | 8/1986 | Barrowman et al. . |
| 4,640,014 | 2/1987 | Thomas . |
| 4,812,671 | 3/1989 | Furrow ............................ 307/10.1 |
| 5,059,954 | 10/1991 | Beldham et al. ................ 340/614 |
| 5,067,250 | 11/1991 | Auweiler et al. . |
| 5,383,134 | 1/1995 | Wrzesinski . |
| 5,448,220 | 9/1995 | Levy . |
| 5,451,939 | 9/1995 | Price . |
| 5,459,459 | 10/1995 | Lee, Jr. . |
| 5,551,162 | 9/1996 | Struble . |

OTHER PUBLICATIONS

Unattributed, Omega Engineering, Inc. Sales Brochure for OM–170 datalogger, Microprocessor–based Portable Datalogger, F–83 through F–88, Dec. 1991.

*Primary Examiner*—James P. Trammell
*Assistant Examiner*—Craig Steven Miller
*Attorney, Agent, or Firm*—Howard & Howard

[57] ABSTRACT

A method of and an apparatus (10) for acquiring measurement data from a gage (54, 62) generating a measurement signal representing a dimensional measurement includes a CPU (46) for setting a dwell range representing desired high and low limits for a value of the measurement signal, setting a dwell time representing a desired time period during which the signal value must be within the dwell range, monitoring the signal value generated by the gage at an input port (52, 60) and accumulating an elapsed time beginning when the signal value enters the dwell range, and recording the signal value in a memory (48) when the elapsed time equals the dwell time. The CPU (46) resets the elapsed time when the signal value exits the dwell range and generating an indication by activating an LED indicator (108) when the elapsed time equals the dwell time. The CPU (46) transmits the signal value to a data collection device (70) connected to an output port (68).

14 Claims, 6 Drawing Sheets

METHOD AND APPARATUS FOR ACQUIRING DATA FROM A MEASUREMENT TRANSDUCER

TECHNICAL FIELD

The subject invention relates to data acquisition from measuring tools and particularly to devices for acquiring, storing and transmitting data generated by gages for measuring the gap between adjacent panels and panel flushness.

BACKGROUND OF THE INVENTION

The consuming public has exhibited a demand for increased quality in the vehicles that are purchased including emphasis on the fit of body panels. Measuring the quality of assemblies formed of spaced panels requires checking the spacings between panel edges and panel surfaces. For example, automobiles have gaps between doors and surrounding panels as well as between the hood and fenders, and during the manufacturing process measurements are frequently made to assure that the correct gap size and panel flushness has been obtained. Vehicle manufacturers are using tools which assist in the control of gaps, margins and flushness between adjacent body panels. Manual checking of such dimensional control criteria is a laborious and time-consuming process which is prone to error and limited in the tolerances that can be measured. There are prior art hand-held tools which integrate automatic measurement and generate data for use in a computerized data collection and computation system.

One prior art device for making gap and flush measurements includes two probes, which are biased to project from the housing of the measuring device and can be moved into the housing against the biasing force. Each probe has a transducer associated with it, which detects the position of the probe and converts it into an electrical signal which can be supplied to an external data processing system. One of the probes is used to measure the gap, while the other probe can be used to measure the flush.

Another prior art measuring device for gap and flush measurement includes a longitudinally displaceable testing rod is arranged in a housing, the displacement of the testing rod being converted by an electromechanical transducer into electrical signals which can likewise be supplied to an external data processing unit. One end of the sensing arm projects on one side of the housing in the region of an application base connected to the housing and is used for measuring the flush. A sensing arm, which together with an application arm extending parallel thereto and secured to the housing of the measuring device forms a testing device in the manner of calipers for measuring gap, is secured to the end of the testing rod projecting at the opposite side from the housing. This measuring device is therefore awkward and time-consuming to manipulate, since it must be manipulated differently for gap and flush measurements, so that it is not possible to determine these values simultaneously. In addition, it is necessary to position the application base precisely on an area of the bodywork in such a way that the axis of the testing rod extends ar right angles to the application surface, since measurement errors can otherwise arise. In this positioning procedure inaccuracies can easily occur which result in measurement errors.

The U.S. Pat. No. 5,451,939 shows a transmitter connected to a source of DC voltage via supply wires and to a temperature sensor. The transmitter includes a housing having terminals for connection to the supply wires and containing transmitter circuitry operable to modulate current in the supply wires to thereby transmit a signal representative of the sensed temperature value. The transmitter circuitry includes a microprocessor and a memory for containing data defining a transfer characteristic to be operated by the microprocessor so that the signal is representative of the sensed value or of a predetermined function of the sensed value. The transmitter further includes an inductive loop for receiving signals relating to the data defining the transfer characteristic from an electronic programming device and circuitry to load the data into the memory in response to the signals received.

The U.S. Pat. No. 5,551,162 shows a device for measuring the gap between the opposed facing surfaces of two adjacent parts, and simultaneously measuring the contour between outwardly facing surfaces of the parts. The device has a hand-held main body with both a gap measuring element and a contour measuring element. The measuring elements are coupled to transducers for generating signals representative of the gap between the opposed facing surfaces of the parts and a relative position of the contour element along a path. A separate digital display is connected to the measuring device by a cable and utilizes the signals to provide a visual display of the measured values. An external device, such as a personal computer, a data collector, or a printer can be connected to the digital display for receiving the signals.

SUMMARY OF THE INVENTION AND ADVANTAGES

The present invention concerns a method of acquiring measurement data from a gage generating a measurement signal representing a dimensional measurement comprises the steps of: setting a dwell range representing desired high and low limits for a value of a dimensional measurement signal generated by the dimensional measurement gage; setting a dwell time representing a desired time period during which the dimensional measurement signal generated by the measurement gage must be within the dwell range; monitoring the value of the dimensional measurement signal and accumulating an elapsed time beginning when the value of the dimensional measurement signal enters the dwell range; and recording the value of the dimensional measurement signal when the elapsed time equals the dwell time. The method includes the step of resetting to zero the elapsed time when the value of the dimensional measurement signal exits the dwell range and the step of generating an indication when the elapsed time equals the dwell time.

The present invention also concerns an apparatus for performing the method comprising: at least one input ports for connection to a gage to receive a dimensional measurement signal generated by the gage; a CPU means connected to the port for monitoring a value of the dimensional measurement signal generated by the gage, comparing the value with a preset dwell range representing desired high and low limits for the value, and accumulating an elapsed time beginning when the value of the dimensional measurement signal enters the dwell range; and a memory means connected to the CPU means, the CPU means storing the value of the dimensional measurement signal in the memory means when the elapsed time equals a dwell time representing a desired time period during which the dimensional measurement signal generated by the measurement gage must be within the dwell range. The apparatus includes a keypad means connected to the CPU means for selecting the dwell range and the dwell time, and an indicator means connected to the CPU means wherein the CPU means activates the indicator means to generate a visual indication when the elapsed time equals the dwell time. The CPU means resets the elapsed time to zero when the value of the dimensional measurement signal exits the dwell range. The apparatus further includes an output port for connection to a data collection device and being connected to the CPU means for transmitting the stored value of the dimensional signal to the data collection device. The apparatus also includes a display connected to the CPU means and being responsive to display signals generated by the CPU means for generating visual messages to a user of the apparatus. The CPU means reads a signal potential on a predetermined pin of the input port when the input port is connected to one of the gages to automatically identify the type of gage.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
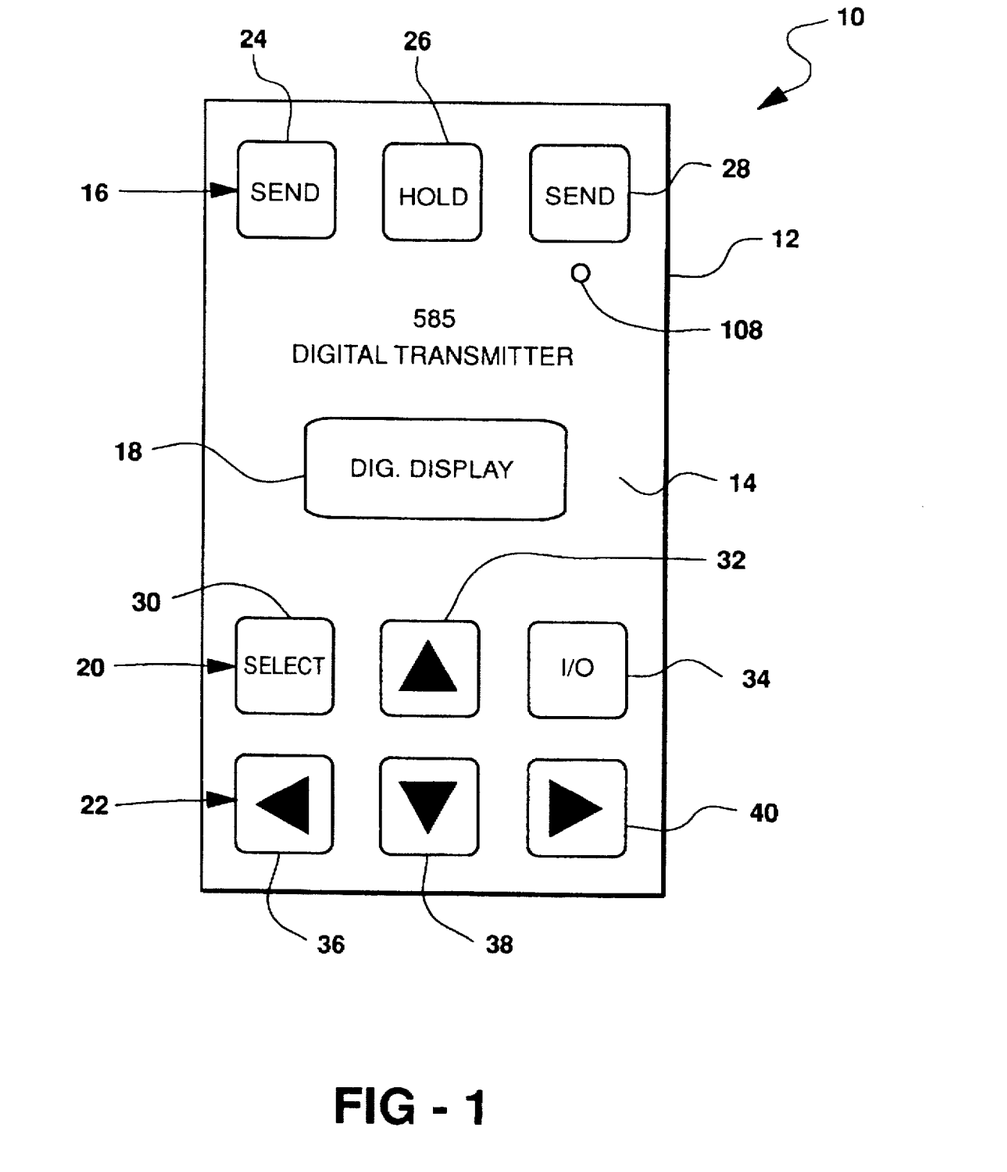
FIG. 1 is a front elevation view of a data acquisition apparatus in accordance with the present invention.

There is shown in the FIG. 1 a data acquisition apparatus 10 including a housing 12 having a generally planar front face 14. Mounted on the front face 14 is an upper row 16 of keys extending generally horizontally adjacent a top edge of the front face, a digital display means 18 below the row 16, a generally horizontally extending center row 20 of keys below the display means and a generally horizontally extending lower row 22 of keys below the center row. The display means 18 can be a two line by eight bit display. The upper row 16 includes a left SEND key 24, a center HOLD key 26 and a right SEND key 28. The center row 20 of keys includes a left SELECT key 30, a center UP arrow key 32 and a right I/O key 34. The lower row 22 of keys includes a left LEFT arrow key 36, a center DOWN arrow key 38 and a right RIGHT arrow key 40.

Figure 2:
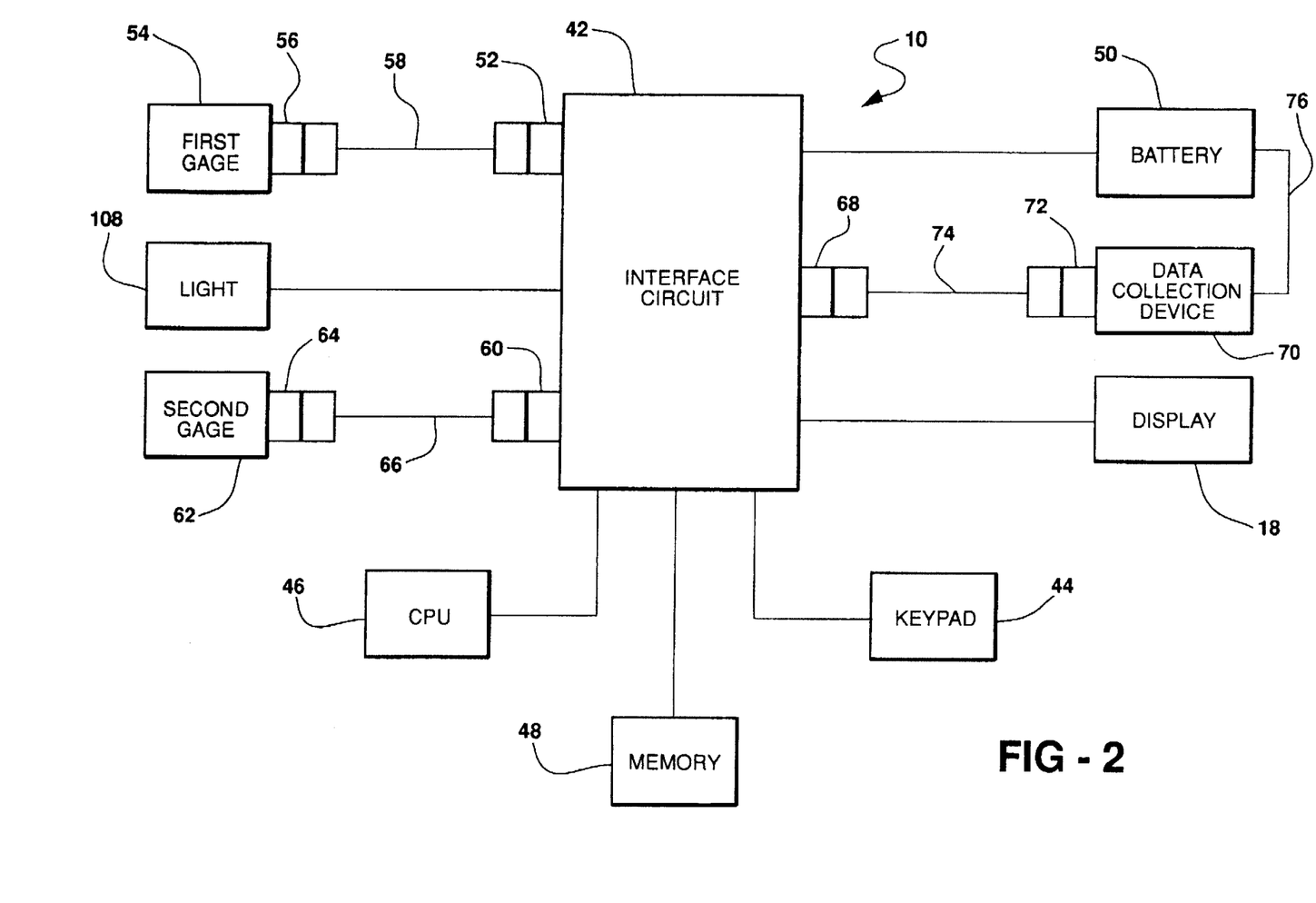
FIG. 2 is block schematic view of the circuitry of the data acquisition apparatus shown in the FIG. 1.

The circuitry of the data acquisition apparatus 10 is mounted in the housing 12 and is shown in schematic block form in the FIG. 2. An interface circuit 42, internal of the housing 12, connects three ports with the major components for acquiring, storing and transmitting data. The interface circuit 42 is connected to the following means all located in the housing 12: the display means 18, a keypad 44, a microprocessor (CPU) 46, a memory 48 and a power source in the form of a battery 50. The keypad 44 includes circuitry for generating operator input signals from each of the keys in the rows of keys 16, 20 and 22 shown in the FIG. 1. The interface circuit 42 has a first port 52, which can be a 4-pin female connector, for connection to an external first measurement transducer or gage 54. The first transducer 54 can be a surface probe type gage or a flush and gap type gage, both available from LMI Corporation of Byron, Mich., each of which generates a single measurement signal at a time. The gage 54 has a 4-pin female connector 56 and can be connected to the port 52 on the housing 12 by a first cable 58 having mating 4-pin male connectors at each end thereof. The interface circuit 42 has a second port 60, which can be a 6-pin female connector, for connection to an external second measurement transducer or gage 62. The second transducer 62 can be a sequential flush and gap type gage (model LMI 241) or a true position type gage, both available from LMI Corporation of Byron, Mich., each of which generates two measurement signals at a time. The gage 62 has a 6-pin female connector 64 and can be connected to the second port 60 by a second cable 66 having mating 6-pin male connectors at each end thereof. The interface circuit 42 has a third port 68, which can be an 8-pin RS-232 female connector, for connection to an external data collection device 70. The device 70 has an 8-pin RS-232 female connector 72 and can be connected to the third port 68 by a third cable 74 having mating 8-pin RS-232 male connectors at each end thereof. The data collection device 70 can be a personal computer or similar device.

The data acquisition apparatus 10 is a battery operated instrument designed expressly to assist in gathering data from various gages. The power source 50 can be a single nine volt alkaline or lithium battery, for example. Under normal single-shift use, alkaline battery life is nominally two weeks. An Ultralife lithium cell will typically last twice as long as the alkaline battery. Alkaline battery life is further extended when connected via a power cable 76 to a conventional personal computer, such as the data collection device 70, as battery power can be augmented by power from the serial port of the computer. The display 18 will indicate a "LOW BAT" message for some time before the battery is exhausted. The apparatus 10 will continue to operate normally under this condition. Should battery output fall below that required for operation at full accuracy, the display 18 will blank and the apparatus 10 will refuse to produce any output data. Proper operation is thus assured to the user. If the battery is replaced before complete power down, all parameters will be saved, as long as the new battery is installed within thirty seconds of removal of the old battery.

A program for operating the apparatus 10 is stored in the memory 48 and includes instructions executed by the CPU 46 to automatically recognize the type of gage connected to the ports 52 and 60, automatically collect data from the gages stabilized in accordance with a settable dwell time and dwell range, and selectively send the collected data to the remote device 70. The type of gage can be automatically recognized by, for example, grounding a specific pin of the second connector 64 and reading the potential on that pin via the CPU 46.

Figure 3:
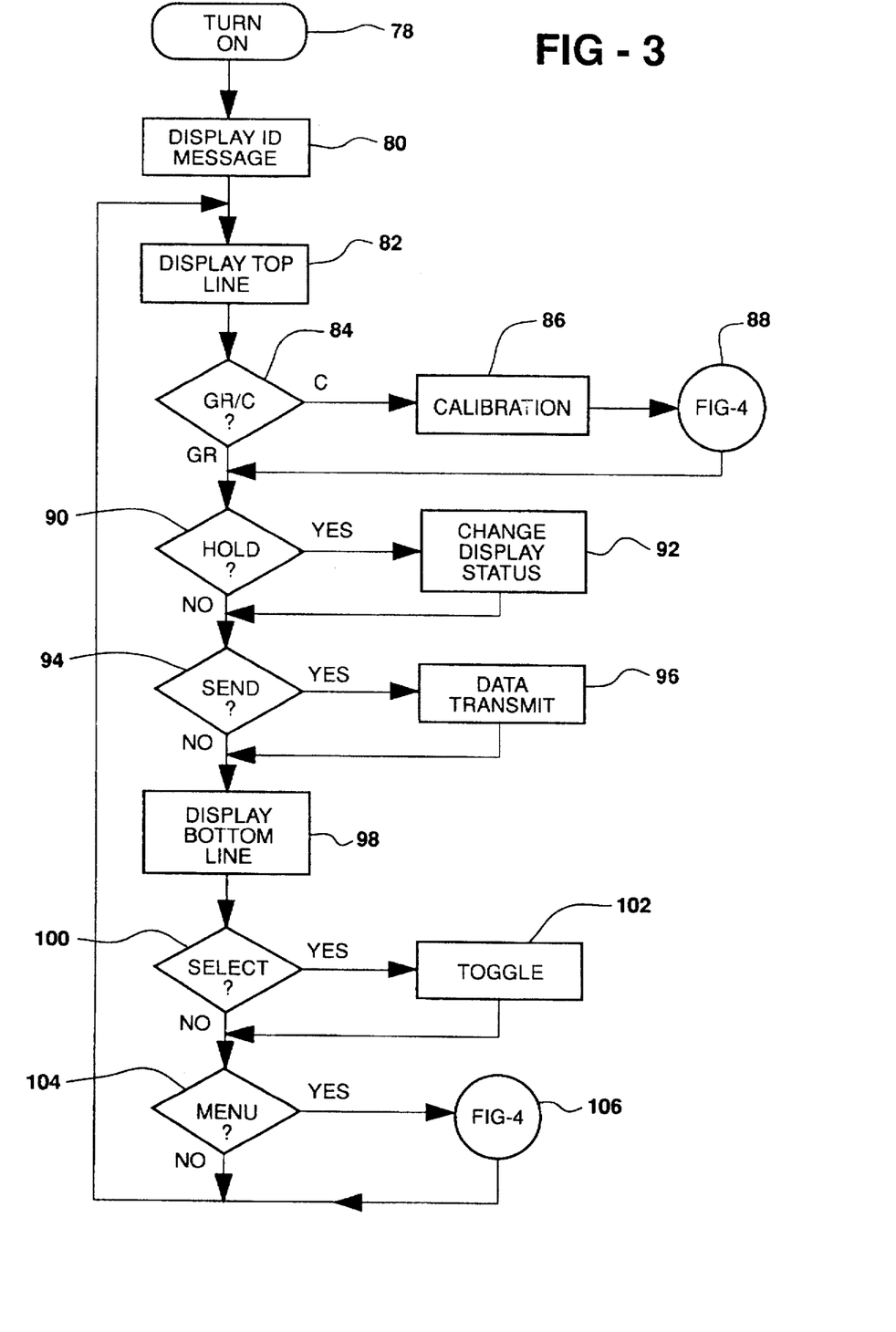
FIG. 3 is a flow diagram of the program for operating the display of the data acquisition apparatus shown in the FIG. 1.

A portion of the operating program related to the display 18 for the data acquisition apparatus 10 is shown in flow diagram form in the FIG. 3. Pressing the I/O key 34 (FIG. 1) will turn the apparatus 10 on or off. When first turned on, the program starts at a TURN ON circle 78 and executes a DISPLAY ID MESSAGE instruction set 80 whereby the CPU 46 sends display signals to the display 18 which responds by displaying an identification message such as the name of the manufacturer, the model number and the version number of the apparatus. The program then executes a DISPLAY TOP LINE instruction set 82 wherein the CPU 46 generates display signals for the top line of the display 18 representing either a current gage reading "GR" message or a calibration is required "C" message. The program enters a GR/C? decision point 84 and branches at "C" if calibration is required to a CALIBRATION instruction set 86. The program then exits the FIG. 3 at a FIG. 4 circle 88 to a menu and returns as described below.

The program branches from the decision point 84 at "GR" if a valid gage reading is being displayed and enters a HOLD? decision point 90 which also is entered from the circle 88 when the program returns from the menu. The top line of the display 18 shows the current gage reading, either in Metric or English units. Pressing the HOLD key 26 (FIG. 1) will freeze (or un-freeze) the current gage reading by causing the program to branch from the decision point at "YES" and enter a CHANGE DISPLAY STATUS instruction set 92. The HOLD (frozen) condition is indicated on the bottom line of the display 18. From either the "NO" branch of the decision point 90 or the instruction set 92, the program enters a SEND? decision point 94 for determining whether to transmit the gage data. If one of the two SEND keys 24, 28 (FIG. 1) is actuated, data is to be transmitted and the program branches at "YES" to a DATA TRANSMIT instruction set 96 whereby the CPU 46 generates data output signals at the third port 68.

The program branches from the decision point 94 at "NO" if neither SEND key has been pressed to enter a DISPLAY BOTTOM LINE instruction set 98 which also is entered from the instruction set 96. The CPU 46 generates display signals to which the display 18 responds by showing which gage is active, and whether or not the battery low is low (LOW BAT message) or hold (HOLD message) is active. The HOLD message reminds the user that the display is frozen and will not update until the HOLD condition is released. The LOW BAT message reminds the user that the battery is getting low and should be replaced promptly to ensure continued operation. The program enters a SELECT? decision point 100 to determine whether the SELECT key 30 (FIG. 1) has been pressed. The program branches at "YES" in response to the SELECT key and enters a TOGGLE instruction set 102. During normal operation of the apparatus 10, pressing the SELECT key 30 will toggle the display between master points (A<=>B) of whichever gage calibration is active. Gage calibration choice can be accomplished either via automatic detection of some types of gages, or manually by pressing the LEFT arrow key 36, which toggles between the gages. If enabled, automatic gage selection will switch to gage calibration master point A when a flush & gap type gage is installed, and to a gage calibration (1P) master point when it is removed.

The program branches from the decision point 100 at "NO" if the SELECT key has not been pressed to enter a MENU? decision point 104 which also is entered from the instruction set 102. The display bottom line is used for the menuing system, which is accessed via the UP arrow key 32 (FIG. 1) or the DOWN arrow key 38 (FIG. 1). When in the normal operating mode, pressing either the UP key 32 or the DOWN key 38 causes the program to exit the decision point 104 at "YES" to a FIG. 4 circle 106 and brings up a main menu choice on the bottom row of the display. All entries on the main menu are accessed by pressing the DOWN key 38 until a desired entry shows in the display, then pressing the RIGHT arrow key 40 to enter a sub-menu. Choices in the menu sequences are shown in the FIG. 4 and the FIG. 5. These choices are described below with the corresponding display of the form "XXXXXX_>" shown in parenthesis wherein the "_>" portion reminds the user to access sub-menu levels by pressing the RIGHT arrow key 40.

MAIN MENU—The default choice is normal operation. Pressing either the UP arrow key 32 or the DOWN arrow key 38 displays the choices CALIBRATION (CALIB_>), COMMUNICATION (COMM_>) and ADVANCED FUNCTIONS (ADVANCED_>) which are described below.

QUICK ZERO—Any calibrated gage can be remastered quickly during normal operation by pressing the HOLD key 26 for two seconds until MASTER? appears on the display. The master position of the connected gage will now be changed to the current master position.

REVIEW—During normal operation, to review the last reading taken, the user presses the RIGHT arrow key 40. To return to data transmit, press either SEND key 24, 28. A green LED indicator light 108 (FIG. 1 and FIG. 2) connected to the interface circuit 42 is actuated to indicate that the current gage reading has been stable within a user defined range and time. The user defines this feature in the ADVANCED FUNCTIONS sub-menus for each port.

CALIBRATION MENU—To calibrate the data acquisition apparatus 10 to a gage, the user must enter at least three probe data points into the CPU 46. These data points are referred to as "HIGH CALIBRATION" (HIGH_CAL), "LOW CALIBRATION" (LOW_CAL) and "MASTER?" (MASTER_), the zero point. The apparatus 10 also allows for a second master point (MASTER_G and the first master point is MASTER_F), that is typically used with a dual-function gage such as an LMI flush & gap transducer. The RIGHT arrow key 40 is used to select the gage to be calibrated from PORT 1A (1P) the default choice, PORT 1B (1F), PORT 2A (2X) and PORT 2B (2Y). Upon selection, the display changes to the associated sub-menu. While entries on this sub-menu can be accessed by pressing the DOWN arrow key 38, a full gage calibration is sped-up by having the menu scroll down automatically as the gage calibration sequence is performed. To perform a calibration step, one simply positions the gage on the proper spot of a calibration block and presses the SELECT key 30. The apparatus 10 will record the gage measurement value and advance to the next sub-menu entry. The user then repositions the gage in the next calibration spot and presses the SELECT key again, repeating until all required calibration points are saved. When done calibrating, the user either presses the SEND key 24, 28 to return to normal operation or presses the LEFT arrow key 36 to return to the previous menu level.

When at the MASTER? step in the calibration process, after the SEND key is pressed, the display will show a numeric value that represents the current MASTER? setting. This will always default to zero, but is user alterable to allow for calibration to a specific distance. In metric mode, the display will initially be "00.000" and will allow for user adjustment of the two digits to the left of the decimal, and three digits to the right, to a maximum limit of "50.000". In the English mode, the initial display will be "0.0000" and will allow for user adjustment of the single digit to the left of the decimal, and the four digits to the right of the decimal, to a maximum limit of "1.9686". The display cursor will initially appear on the left-most digit. The operator can press the UP arrow key 32 or the DOWN arrow key 38 to respectively increase or decrease the value of the current digit. The RIGHT arrow key 40 and the LEFT arrow key 36 move between digits of the number. When the desired numeric value has been entered, the operator must press the SELECT key 30 to continue with the calibration process, or to return to other menu options.

For flexibility, the positive direction is user defined. The apparatus determines the positive direction from the HIGH CALIBRATION and LOW CALIBRATION entries such that the LOW CALIBRATION entry is in the negative direction and the HIGH CALIBRATION entry is in the positive direction. The actual number of units from LOW to HIGH is taken from the CAL. SPAN entry (explained below), which defaults to a standard of 10.000 mm (0.3937").

COMMUNICATION MENU—When the apparatus 10 is to enter data into the remote device 70, it must communicate with that device via the RS-232 connection 68. The communications sub-menu provides these choices via the COMMUNICATION sub-menu. The data format may also change depending on the device the data is being sent to. The pre-programmed formats are accessed via a FORMAT sub-menu (not shown). Choices in the COMMUNICATION sub-menu are EXPORT (EXPORT_>), the default choice, and ON/OFF (ON/OFF_>). Individual entries on this sub-menu are accessed by pressing the UP arrow key 32 or the DOWN arrow key 38, and the currently selected entry will have its first character blinking. To accept a new choice and return to normal operation, the user presses the SELECT key 30; to make no change, the user presses the LEFT arrow key 36 to return to the previous menu level. Choices for the EXPORT sub-menu are EXPORT 1 (the default choice) and EXPORT 2 which are accessed by pressing the UP arrow key 32 or the DOWN arrow key 38, and the currently selected entry will have its first character blinking. To accept a new choice, the user presses the SELECT key 30. The EXPORT LABEL sub-menu choices are OFF (OFF_), the default choice, and ON (ON_). The choices in the ON/OFF sub-menu are ON (ON), the default choice, and OFF (OFF_) which will turn on and off respectively the RS232 communication. The program can cause the light 108 to blink when data is being transmitted.

ADVANCED FUNCTIONS MENU—The data acquisition apparatus 10 supports a variety of setup choices to allow customizing the unit to the operator's requirements. Provisions are made for using either Metric or English units, to enable or disable automatic gage selection, and to set the calibration span. Choices in the ADVANCED FUNCTIONS sub-menu are: P1A (PORT1A_>), the default choice; P1B (PORT1B_>); P2A (PORT2A_>); P2B (PORT2B_>; AUDIO (AUDIO_>); F/G TGL. (F/GTOGGLE_>); and UNITS (UNITS_>). Choices in the P1A sub-menu are: READ (READ_>); GAGE LABEL LABEL_>); and CAL. SPAN (CALSPAN_>). READ is selected by pressing the RIGHT arrow key 40 to enable the choices: MANUAL (the default choice); AUTO; and OFF. This sub-menu level controls the data transmission type. Selecting AUTO or MANUAL will allow the user to set a dwell range and dwell time as shown in the FIG. 6 discussed below. These settings also control the activation of the green LED 108. The GAGE LABEL choice is selected by pressing the RIGHT arrow key 40 which enables the user to set the gage label to P (default choice), X, Y, Z, A, B, F, or G. The CALSPAN choice is selected by pressing the RIGHT arrow key 40 to enable the user to adjust the calibration span to 50.000 mm or 1.9686 inches.

Choices in the P1B sub-menu are: READ (READ_>); GAGE LABEL (LABEL_>); GAGE AUTOSEL (AUTOSEL_>); and CAL. SPAN (CALSPAN >). Three of the choices are similar to the P1A like named sub-menu choices. However, the GAGE LABEL choice is selected by pressing the RIGHT arrow key 40 and the user will be able to set the gage label to F/G (default choice), G/F, A, B, F, G, P, X, Y, or Z. After selecting the gage label of F/G or G/F, the user will be prompted to leave the sign normal or reverse the sign of the second master point. Choices in the GAGE AUTOSEL sub-menu are MANUAL (the default choice) and AUTO. Again individual entries on this sub-menu are accessed by pressing the UP arrow key 32 or the DOWN arrow key 38, and the currently selected entry will have its first character blinking. To accept a new choice (and return to normal operation), the user presses the SELECT key 30; to make no changes, the user presses the LEFT arrow key 36 to return to the previous menu level.

Choices in the P2A & P2B sub-menus are: READ (READ_>); GAGE LABEL (GAGE LABEL_>); and CAL. SPAN (CALSPAN_>). READ permits the user to set the dwell range and the dwell time. The user selects GAGE LABEL for ports P2A & P2B by pressing the RIGHT arrow key 40. The user will be able to set the gage label to X, Y, A, B, F or G.

Choices in the AUDIO sub-menu are ON (default choice) and OFF. The AUDIO portion of the program controls a buzzer (not shown) which can be activated to indicate that data has been sent to the data collection device 70 (FIG. 2). Choices in the F/G TGL sub-menu are MANUAL F/G (MAN A/B) and ALT. F/G (ALT A/B). The user chooses one of these with the RIGHT arrow key 40, and observes the display bottom line change to the appropriate sub-menu.

Choices in the UNITS sub-menu are METRIC (METRIC_), the default choice, and INCHES (ENGLISH_). Again individual entries on this sub-menu are accessed by pressing the UP arrow key 32 or the DOWN arrow key 38, and the currently selected entry will have the first character blinking.

To accept a new choice (and return to normal operation), the user presses the SELECT key 30; to make no change, the user presses the LEFT arrow key 36 to return to the previous menu level. The choices in the CAL. SPAN sub-menu are 10 MM (initial/default value) and 0.3937". Pressing the UP arrow key 32 or the DOWN arrow key 38 allows the numeric value to go up or down in one mm increments (or the equivalent english amount of one mm increments), to a minimum of two mm, and a maximum of fifty mm. To accept a value, the user presses the SELECT key 30; to make no change, the user presses the LEFT arrow key 36 to return to the previous menu level.

Pressing the DOWN arrow key 38, will scroll through the sub-menu choices. The current selection will have the first character blinking. To accept a new choice, the user presses the Select key 30. To make no changes, the user presses the LEFT arrow key 36 to return to the previous menu level and to the main program in the FIG. 3.

The invention has been described in an illustrative manner, and it is to be understood that the terminology which has been used is intended to be in the nature of words of description rather than of limitation.

Figure 4:
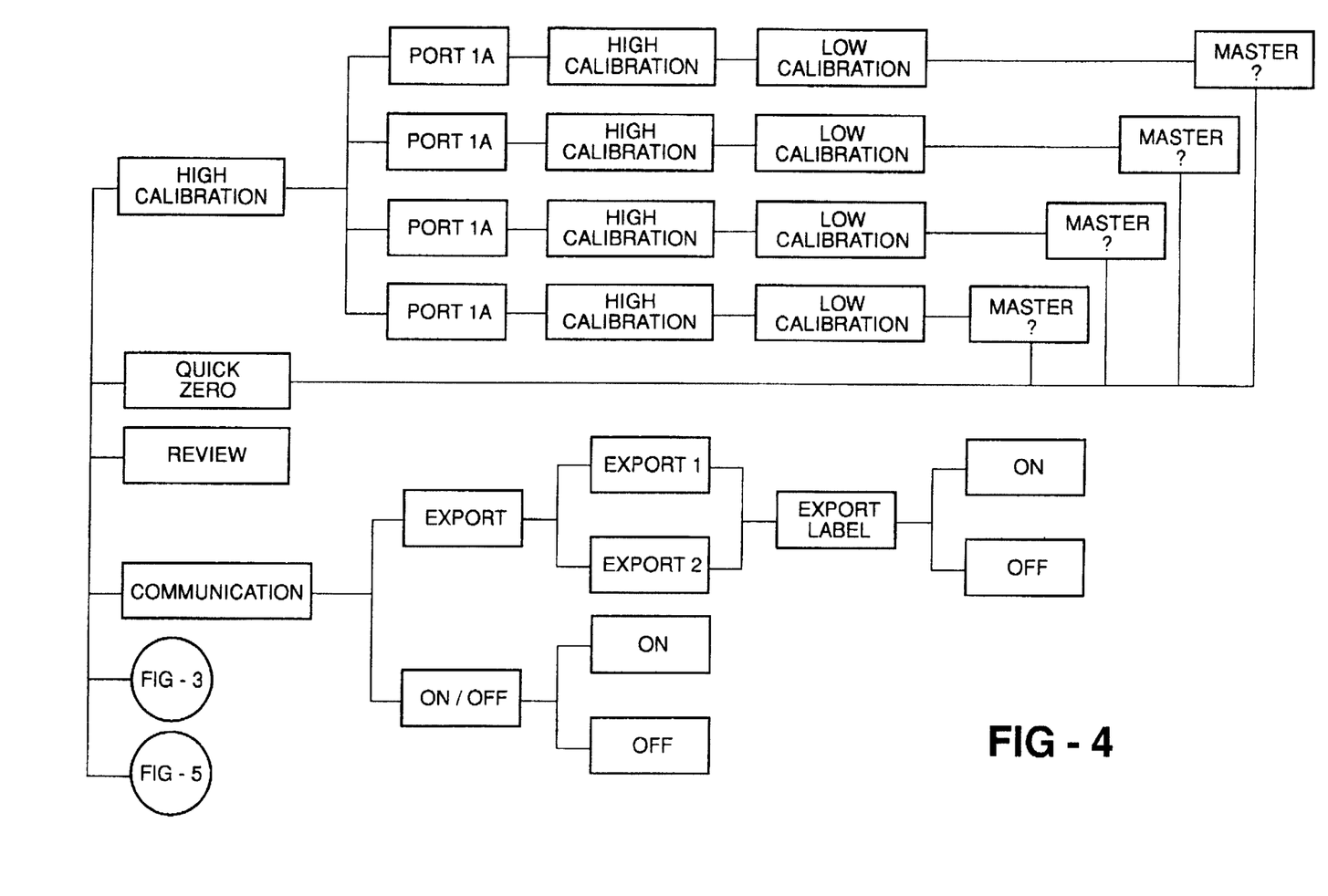
FIG. 4 and FIG. 5 are a flow diagram of the menu for the operating program shown in the FIG. 3.
Figure 5:
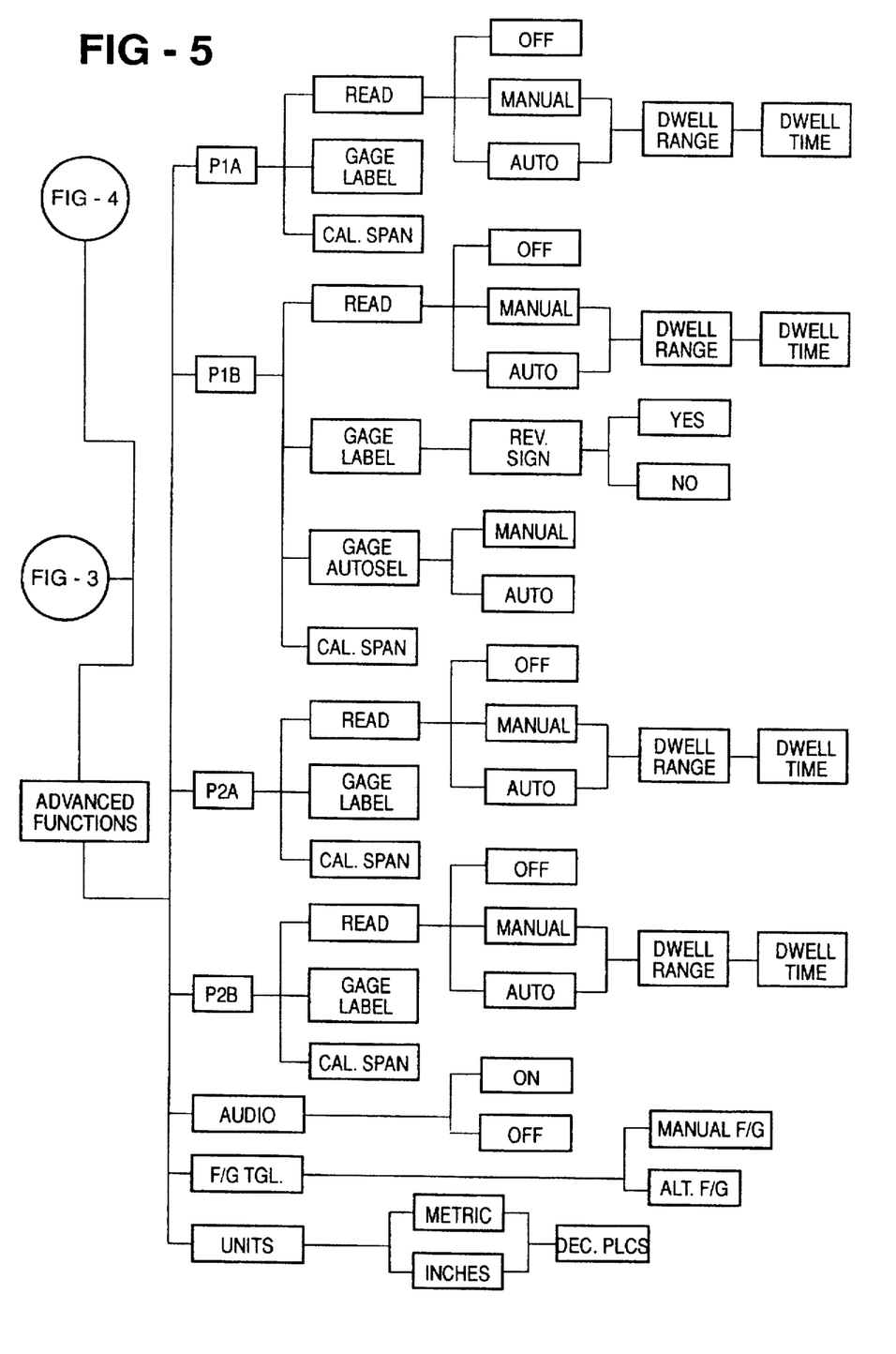
Figure 6:
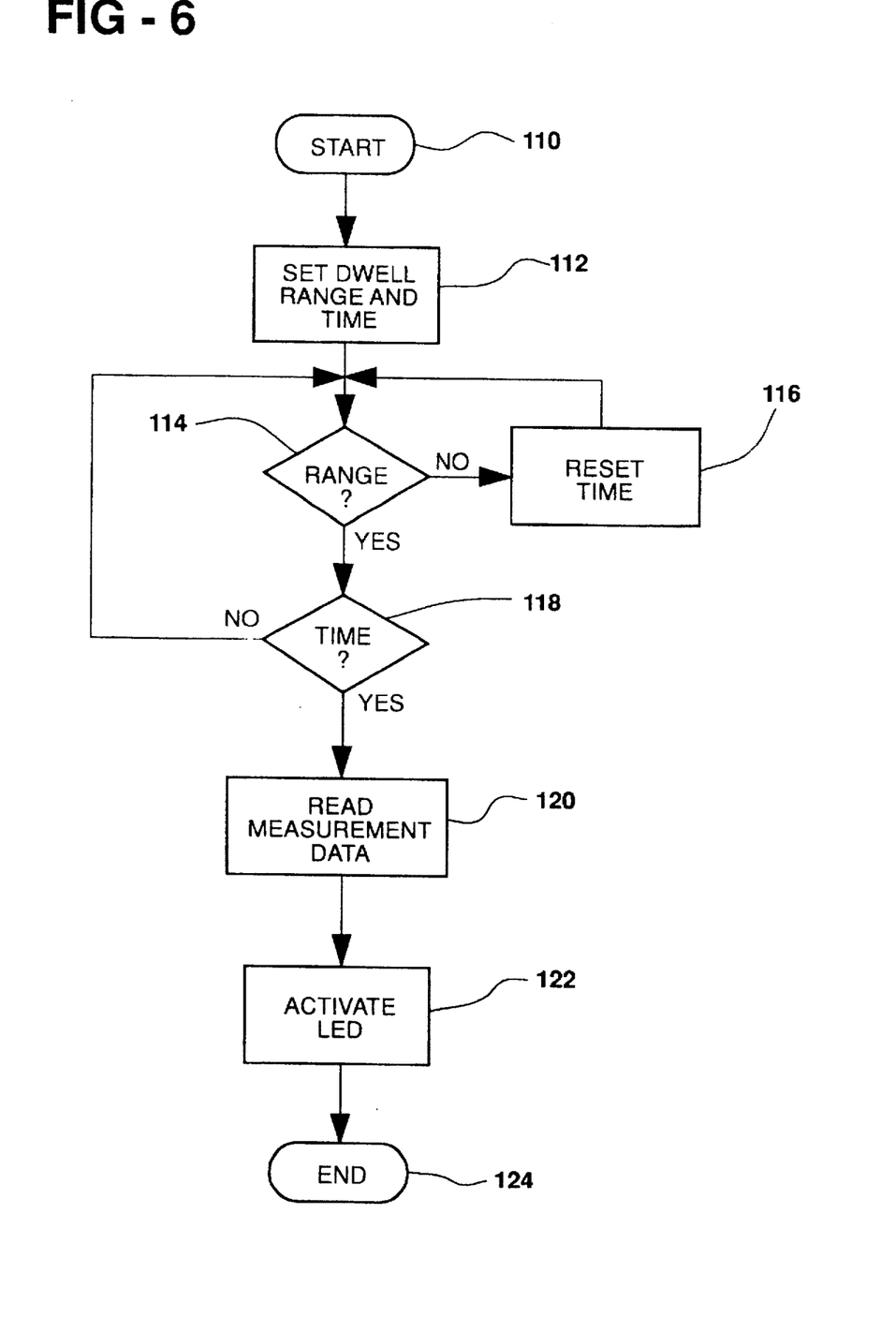
FIG. 6 is a flow diagram of the program for operating the data acquisition function of the data acquisition apparatus shown in the FIG. 1.

In the MANUAL and AUTO modes shown in the FIG. 4, the program enters a portion of the operating program shown in the FIG. 6 at a START circle 110. The program then enters a SET DWELL RANGE AND TIME instruction set 112. At a RANGE? decision point 114, the program checks the gage measurement value. If the value is not in the preset dwell range, the program branches at "NO" and rests the elapsed time in a RESET TIME instruction set 116 before returning to the decision point 114. If the value is in the preset dwell range, the program branches at "YES" and enters a TIME? decision point 118 to determine whether the preset dwell time has elapsed. If the dwell time has not elapsed, the program branches at "NO" back to the decision point 114. If the dwell time has elapsed, the program branches at "YES" to a READ MEASUREMENT DATA instruction set 120 to automatically read and store the gage measurement data. The program enters an ACTIVATE LED instruction set 122 to light the LED 108 indicating to the user that a stable reading has occurred. The program exits at an END circle 124.

In summary, the method of acquiring measurement data from a gage generating a measurement signal representing a dimensional measurement comprises the steps of: a. setting a dwell range representing desired high and low limits for a value of a dimensional measurement signal generated by the dimensional measurement gage; b. setting a dwell time representing a desired time period during which the dimensional measurement signal generated by the measurement gage must be within the dwell range; c. monitoring the value of the dimensional measurement signal and accumulating an elapsed time beginning when the value of the dimensional measurement signal enters the dwell range; and d. recording the value of the dimensional measurement signal when the elapsed time equals the dwell time. The method includes the step of resetting to zero the elapsed time when the value of the dimensional measurement signal exits the dwell range and the step of generating an indication when the elapsed time equals the dwell time.

The apparatus 10 for performing the method comprises: at least one of the input ports 52, 60 for connection to one of the gages 54, 62 to receive the dimensional measurement signal generated by the gage; the CPU means 46 connected to the port for monitoring a value of the dimensional measurement signal generated by the gage, comparing the value with a preset dwell range representing desired high and low limits for the value, and accumulating an elapsed time beginning when the value of the dimensional measurement signal enters the dwell range; and the memory means 48 connected to the CPU means, the CPU means storing the value of the dimensional measurement signal in the memory means when the elapsed time equals a dwell time representing a desired time period during which the dimensional measurement signal generated by the measurement gage must be within the dwell range. The apparatus 10 includes a keypad means 44 connected to the CPU means 46 for selecting the dwell range and the dwell time, and an indicator means 108 connected to the CPU means wherein the CPU means activates the indicator means to generate a visual indication when the elapsed time equals the dwell time. The CPU means 46 resets the elapsed time to zero when the value of the dimensional measurement signal exits the dwell range. The apparatus 10 includes the output port 68 for connection to the data collection device 70 and being connected to the CPU means for transmitting the stored value of the dimensional signal to the data collection device. The apparatus 10 also includes the display 18 connected to the CPU means 46 and being responsive to display signals generated by the CPU means for generating visual messages to a user of the apparatus. The CPU means 46 reads a signal potential on a predetermined pin of the input port 52, 60 when the input port is connected to one of the gages 54, 62 to automatically identify the type of gage.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of acquiring measurement data from a gage generating a measurement signal representing a dimensional measurement comprising the steps of:

a. setting a dwell dimensional range representing high and low limits for a value of a dimensional measurement signal generated by a dimensional measurement gage making dimensional measurements;

b. setting a dwell time period representing a length of time period during which the dimensional measurement signal generated by the measurement gage must remain within the dwell dimensional range;

c. timing the elapsed period the dimensional measurement signal remains in the dwell dimensional range; and d. recording the value of the dimensional measurement signal in response to the elapsed time equaling the dwell time period.

2. The method according to claim 1 including a step of resetting to zero the elapsed time when the value of the dimensional measurement signal exits the high and low limits of the dwell dimensional range.

3. The method according to claim 1 including a step of generating an indication when the elapsed time equals the dwell time period.

4. The method according to claim 3 wherein said step of generating an indication includes activating a visual indicator.

5. The method according to claim 1 wherein said step of recording the value includes storing the value as measurement data in a memory.

6. The method according to claim 1 wherein said step of recording the value includes transmitting the value as measurement data to a data collection device.

7. The method according to claim 6 including generating an indication that the value is being transmitted.

8. An apparatus (10) for acquiring measurement data from a gage generating a measurement signal representing a dimensional measurement comprising:

at least one input port (52, 60) for connection to a gage (54, 62) to receive a dimensional measurement signal representing a dimensional measurement generated by the gage;

a CPU means (46) connected to said port (52, 60) and monitoring a value of the dimensional measurement signal generated by the gage for comparing the value with a preset dwell dimensional range representing desired high and low limits for the value and for accumulating an elapsed time during which the value of the dimensional measurement signal remains in the dwell dimensional range; and a memory means (48) connected to said CPU means (46) for storing the value of the dimensional measurement signal in response to the elapsed time equaling a predetermined dwell time period during which the dimensional measurement signal generated by the measurement gage remains within the dwell dimensional range.

9. The apparatus (10) according to claim 8 including a keypad means (44) connected to said CPU means (46) for selecting the dwell dimensional range and the dwell time period.

10. The apparatus (10) according to claim 8 including an indicator means (108) connected to said CPU means (46) wherein said CPU means activates said indicator means to generate a visual indication when the elapsed time equals the dwell time period.

11. The apparatus (10) according to claim 8 wherein said CPU means (46) resets the elapsed time to zero when the value of the dimensional measurement signal exits the high and low limits of the dwell dimensional range.

12. The apparatus (10) according to claim 8 including an output port (68) for connection to a data collection device (70) and being connected to said CPU means (46) for transmitting the stored value of the dimensional signal to the data collection device.

13. The apparatus (10) according to claim 8 including a display (18) connected to said CPU means (46) and being responsive to display signals generated by said CPU means for generating visual messages to a user of the apparatus.

14. The apparatus (10) according to claim 8 wherein said CPU means (46) reads a signal potential on a predetermined pin of said input port (52, 60) when said input port is connected to a gage (54, 62) to automatically identify the type of gage.

* * * * *